US007114580B1

(12) United States Patent
Balogh

(10) Patent No.: US 7,114,580 B1
(45) Date of Patent: Oct. 3, 2006

(54) METHOD AND APPARATUS FOR DETERMINING A TRAJECTORY OF A DIRECTIONAL DRILL

(75) Inventor: W. Thomas Balogh, Houston, TX (US)

(73) Assignee: Microtesla, Ltd., Houston, TX (US)

( * ) Notice: Subject to any disclaimer, the term of this patent is extended or adjusted under 35 U.S.C. 154(b) by 127 days.

(21) Appl. No.: 10/371,623

(22) Filed: Feb. 21, 2003

(51) Int. Cl.
  *E21B 47/00* (2006.01)
(52) U.S. Cl. ..................... 175/45; 166/255.2
(58) Field of Classification Search .......... 166/250.01, 166/255.1, 255.2; 175/24, 26, 40, 45, 57, 175/61, 62, 73; 340/853.1, 853.5, 853.6, 340/853.4; 73/152.01, 152.43, 152.46, 152.49; 33/340, 313; 356/139.03, 139.04, 139.1, 356/140, 634
See application file for complete search history.

(56) References Cited

U.S. PATENT DOCUMENTS

| | | | | |
|---|---|---|---|---|
| 4,013,134 A | * | 3/1977 | Richmond et al. | 175/73 |
| 4,042,046 A | * | 8/1977 | Capoccia | 175/73 |
| 4,506,745 A | * | 3/1985 | Bjor | 175/45 |
| 4,513,504 A | * | 4/1985 | Nussbaumer et al. | 33/1 H |
| 4,534,424 A | * | 8/1985 | Ramsey | 175/40 |
| 4,631,519 A | * | 12/1986 | Johnston | 341/13 |
| 4,646,277 A | * | 2/1987 | Bridges et al. | 340/853.5 |
| 4,656,743 A | * | 4/1987 | Thiemann et al. | 33/1 H |
| 5,099,927 A | * | 3/1992 | Gibson et al. | 175/45 |
| 5,193,628 A | | 3/1993 | Hill et al. | 175/45 |
| 5,203,418 A | * | 4/1993 | Gibson et al. | 175/45 |
| 5,361,854 A | * | 11/1994 | Tull et al. | 175/45 |
| 5,390,748 A | * | 2/1995 | Goldman | 175/24 |
| 5,725,059 A | * | 3/1998 | Kuckes et al. | 175/45 |
| 5,964,306 A | * | 10/1999 | Barbera | 175/122 |
| 6,026,914 A | * | 2/2000 | Adams et al. | 175/45 |
| 6,102,136 A | * | 8/2000 | Archambeault et al. | 175/45 |
| 6,135,215 A | * | 10/2000 | Ericksen | 175/61 |
| 6,405,808 B1 | * | 6/2002 | Edwards et al. | 175/45 |
| 6,427,784 B1 | * | 8/2002 | Archambeault et al. | 175/45 |
| 6,480,289 B1 | * | 11/2002 | Shimomura et al. | 356/614 |
| 6,708,782 B1 | * | 3/2004 | Turney | 175/40 |

OTHER PUBLICATIONS

FETC, "Innovative Directional and Position Specific Sampling Technique," pp. 127-128 (Oct. 1997).
Boyd, Gregory M., "Steerable/Distance Enhanced Penetrometer Delivery System," pp. 1-10.
U.S. Department of Energy, Innovative Directional and Position Specific Sampling Technique (POLO), pp. 1-18 Jun. 1999.

* cited by examiner

*Primary Examiner*—William Neuder
(74) *Attorney, Agent, or Firm*—Williams, Morgan & Amerson, P.C.

(57) ABSTRACT

An apparatus for determining a trajectory of a directional drill includes two length measurement devices deployed along a surface of the drill string and a controller capable of determining the heading of the drill string from two lengths of the drill string measured by the two length measurement devices. A method includes determining at least two lengths along a surface of a drill string; and determining a heading of the drill string using the at least two determined lengths.

33 Claims, 7 Drawing Sheets

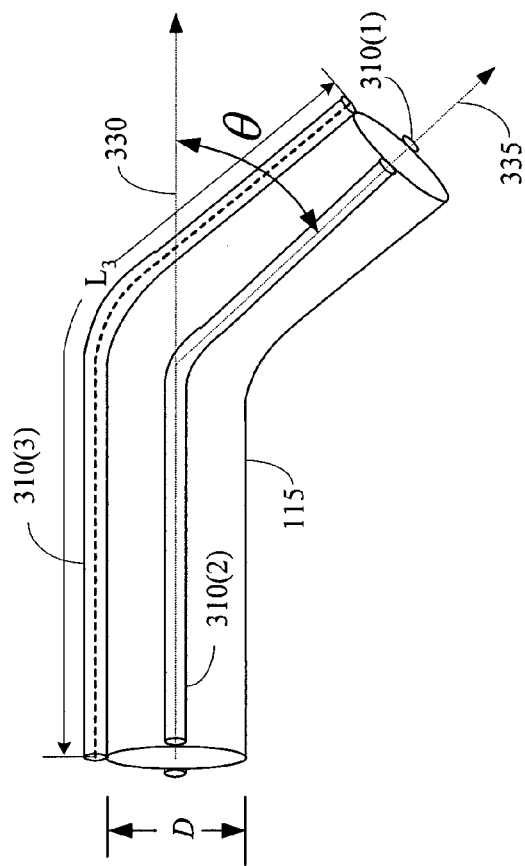
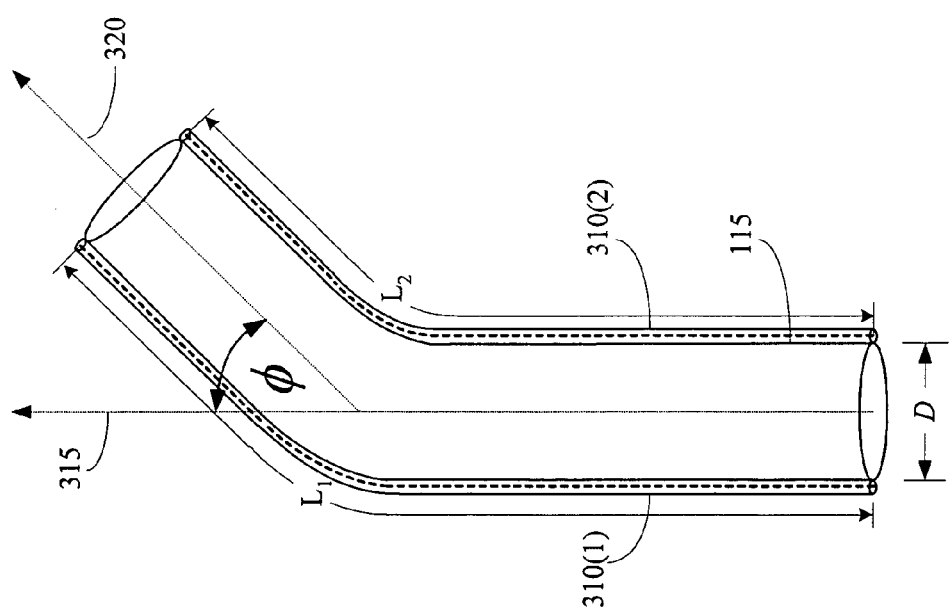
Figure 3B
Figure 3A

METHOD AND APPARATUS FOR DETERMINING A TRAJECTORY OF A DIRECTIONAL DRILL

BACKGROUND OF THE INVENTION

1. Field of the Invention

This invention relates generally to directional drilling, and, more particularly, to determining a trajectory of a directional drill.

2. Description of the Related Art

Directional drilling involves the controlled drilling of a borehole from a first point to a second point. For example, directional drilling may be used to drill a borehole from a location on the surface of the earth to a location deep underground. For another example, directional drilling may be used to drill a borehole that begins at a first location on the earth's surface, travels underground for a selected distance, and the returns to the surface at a second location. Typically, in directional drilling, the second point is horizontally, or azimuthally, displaced from the first so that one cannot simply drill straight down from the surface.

In the past, high costs limited the use of directional drilling to oil field and mining applications, where the drilling costs could be offset by the value of the oil or minerals produced by the well or mine. However, improvements in drilling technology have reduced the costs of some directional drilling applications. In particular, so-called "trench-less" directional drilling, in which nearly horizontal boreholes are drilled just below the earth's surface, has become a cost-effective method of drilling boreholes for various utility services, such as telephone lines, electrical lines, water lines, sewer lines, and the like. Trench-less directional drilling is typically employed when surface level obstructions make traditional trenched utility access difficult or impossible. For example, trench-less directional drilling is often used to drill boreholes beneath rivers, roads, commercial and residential buildings, and the like.

The drill string used to convey the cutting element into the borehole may bend during the directional drilling process. The bending of the drill string may be intentional, such as when a drill operator changes the heading of the cutting element, e.g. a drill bit, which changes the trajectory of the drill string. For example, the drill operator may change the heading of the cutting element to avoid an obstruction or to correct the trajectory. Sometimes, bending occurs unintentionally. For example, changes in the media being drilled or unbalanced forces produced by the drilling process may cause the heading of the cutting element, and the trajectory of the drill string, to change unexpectedly. Consequently, the actual trajectory of the drill string may deviate from the expected trajectory. The drill string is not, however, visible to the drill operator during the trench-less directional drilling process. Thus, trench-less directional drilling processes typically include some method of determining the trajectory of the drill string from the earth's surface.

Two methods are traditionally used to determine the trajectory of the directional drill. The first method uses a magnetometer package including an inclinometer and a magnetometer. The inclinometer is used to determine the inclination or tilt of the drilling assembly by measuring the earth's gravity vector and the magnetometer is used to determine a compass, or magnetometer, heading. The inclination and heading are measured at known depth positions and used to calculate the trajectory of the drill string. The second method uses a gyro package that includes a gyro and an inclinometer, which are similarly used to measure heading and inclination to calculate the trajectory of the drill string. However, the high cost of survey-accuracy magnetometer or gyro packages has restricted their use in trench-less directional drilling as discussed above. Furthermore, magnetic materials are often used in directional drilling assemblies, which may limit, or prevent, the use of magnetometers.

In recent years, another method has been employed to determine the trajectory using an electromagnetic signal. Typically, the electromagnetic signal is either injected or generated near the directional drilling assembly. An operator on the surface then detects the electromagnetic signal using an electromagnetic measurement device. The operator then uses the detected signal to determine the location of the drilling assembly. However, this method is limited to near-surface trench-less directional drilling applications. Furthermore, surface obstructions may make it difficult, or impossible, for the operator to detect the electromagnetic signal.

A laser positioning apparatus for an earth boring apparatus is described in Tull, et al (U.S. Pat. No. 5,361,854), hereinafter referred to as the Tull patent. In the Tull patent, a pair of lasers and a pair of light-sensing elements, or targets, are coupled to each of a plurality of sections of drill pipe. The angular displacement of adjacent sections of the drill pipe may be determined using oppositely directed laser beams produced by the lasers and detected by the light sensing elements. However, the use of multiple lasers and light-sensing elements may be limited by the cost of these devices. Furthermore, exposing sophisticated lasers and light-sensing elements to the borehole environment would likely result in high maintenance and repair costs, as well as diminished reliability.

SUMMARY OF THE INVENTION

In one aspect of the instant invention, an apparatus is provided for determining a trajectory of a directional drill. The apparatus includes two length measurement devices deployed along a surface of the drill string and a controller capable of determining the heading of the drill string from two lengths of the drill string measured by the two length measurement devices.

In another aspect of the present invention, a method is provided for determining a trajectory of a directional drill. The method includes determining at least two lengths along a surface of a drill string and determining a heading of the drill string using the at least two determined lengths.

BRIEF DESCRIPTION OF THE DRAWINGS

The invention may be understood by reference to the following description taken in conjunction with the accompanying drawings, in which like reference numerals identify like elements, and in which:

FIG. 3A conceptually illustrates a top-down view of a drill string, including two length measurement devices, which may be used in the directional drilling systems shown in FIGS. 1A–B and 2;

FIG. 3B conceptually illustrates a side-view of the drill string, including three length measurement devices, which may be used in the directional drilling systems shown in FIGS. 1A–B and 2;

Figure 1A:
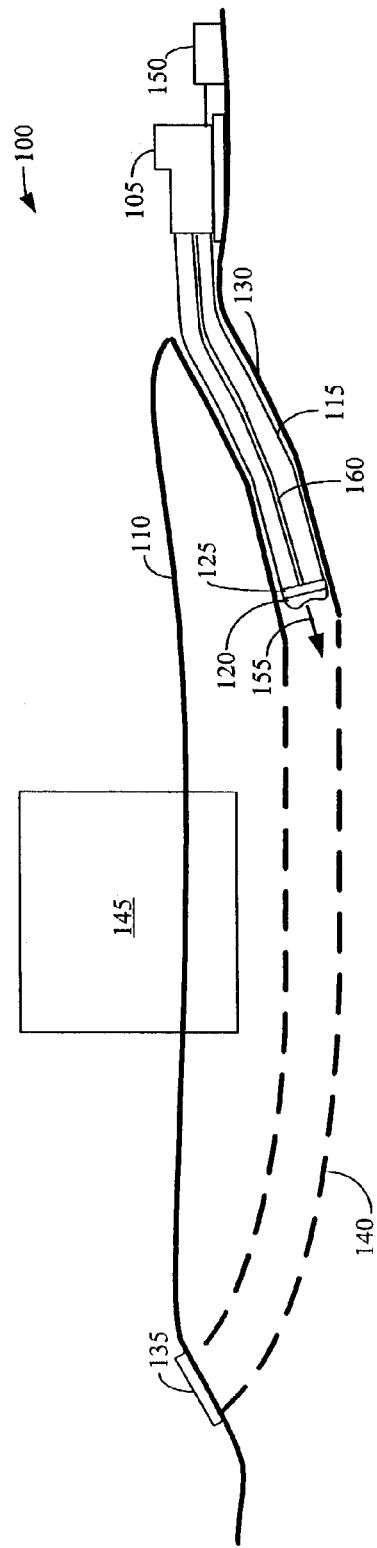
FIG. 1A conceptually illustrates a side view of a trench-less directional drilling system.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

FIG. 1A conceptually illustrates a side view of an exemplary trench-less drilling system 100. In one embodiment of the exemplary trench-less drilling system 100, a drilling apparatus 105 is positioned at or near the earth's surface 110. For example, the drilling apparatus 105 may be a cased auger boring machine, such as the model McL-48/54 produced by McLaughlin Boring Systems. Although the exemplary trench-less drilling system 100 illustrated in FIG. 1A is deployed on the earth's surface 110, it will be appreciated by those of ordinary skill in the art having benefit of the present disclosure that the present invention may also be used in various underwater drilling applications. For example, in various alternative embodiments, the drilling apparatus 105 may be a jack-up rig, a derrick barge, a semi-submersible rig, a drill ship, and the like.

A drill string 115 is coupled to the drilling apparatus 100. In various alternative embodiments, some of which are discussed in detail below, the drill string 115 may be formed of rigid elements, flexible elements, or a combination of rigid and flexible elements, as will be appreciated by those of ordinary skill in the art having benefit of the present disclosure. A drill bit 120 is deployed at the end of the drill string 115. For example, the drill bit 120 may be coupled to the drill string 115 by a collar 125. The drill bit 120 is used to form a borehole 130 extending from the drilling apparatus 105 to a target 135. For example, the drill bit 120 may be an auger boring assembly, a mud motor, or a mud turbine. In the embodiment illustrated in FIG. 1A, the target 135 is located on the earth's surface 110. However, in alternative embodiments, the target 135 may be located beneath the earth's surface 110.

Figure 1B:
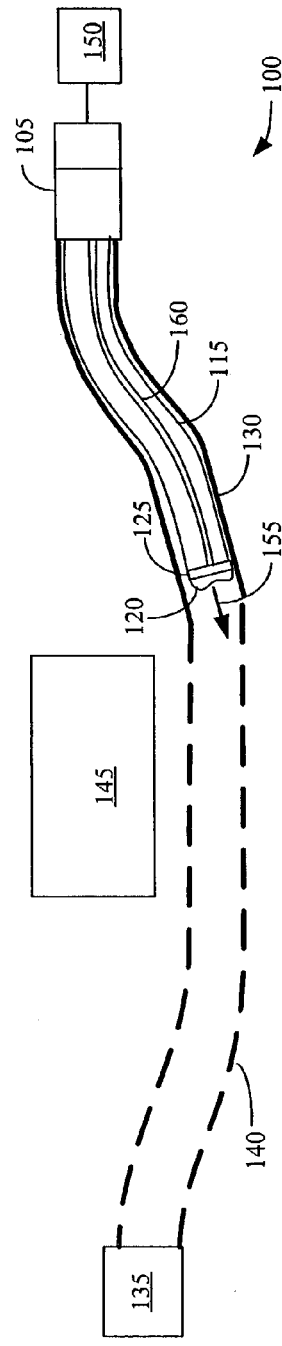
FIG. 1B conceptually illustrates a top-down view of the trench-less directional drilling system shown in FIG. 1A.

The borehole 130 typically follows a desired trajectory 140, which is indicated by dashed lines in FIG. 1A. In the illustrated embodiment, an obstruction 145 is located between the drilling apparatus 105 and the target 135. For example, the obstruction 145 may be a commercial or residential building, a river, a road, and the like. In order to avoid the obstruction 145, the desired trajectory 140 of the borehole 130 may include a vertical deviation that enables the borehole 130 to pass beneath the obstruction 145. Alternatively, the desired trajectory 140 of the borehole 130 may include a horizontal deviation that enables the borehole 130 to pass to one side of the obstruction 145, as shown in FIG. 1B, which conceptually illustrates a top-down view of the exemplary trench-less drilling system 100. Furthermore, in various other embodiments, the desired trajectory 140 of the borehole 130 may include any desirable combination of vertical and horizontal deviations.

A controller 150 is coupled to the drilling apparatus 105. The controller 150 is typically capable of controlling the drill bit 120 such that the drill bit 120 follows a heading 155. For example, the controller 150 may provide signals that may be used to provide guiding forces that may change the heading 155 of the drill bit 120. As this process is well known to those of ordinary skill in the art and not material to the present invention, it will not be described in any further detail herein. Furthermore, although the controller 150 is shown positioned on the earth's surface 110, persons of ordinary skill in that art will appreciated that the controller 150 may be positioned in any desirable location. For example, the controller 150, or any desirable portion thereof, may be positioned in the drill string 115.

Two or more length measurement devices 160 are deployed along a surface of the drill string 115. In the illustrated embodiment, the two or more length measurement devices 160 extend from the drilling apparatus 105 to the drill bit 120 and are displaced angularly about an axis of the drill string 115. Thus, each of the length measuring devices 160 may be used to determine a corresponding length along the drill string 115. As will be described in more detail below, the controller 150 is capable of determining the heading 155 using the two or more lengths determined by the two or more length measuring devices 160, in accordance with one embodiment of the present invention. Furthermore, persons of ordinary skill in the art having benefit of the present disclosure will appreciate that the number of length measurement devices 160 in excess of the two shown in FIG. 1A, as well as the positions of the length measurement devices 160 along the surface of the drill string 115, are matters of design choice and not material to the present invention.

The controller 150 is capable of determining the trajectory of the drill string 115 using the determined heading 155. For example, the controller 150 may determine the trajectory of the drill string 115 by combining the determined heading 155 with previously determined headings 155 and the two or more lengths determined by the two or more length measuring devices 160. In one embodiment, the controller 150 may form a signal indicative of a difference between the determined trajectory and the desired trajectory 140.

Figure 2:
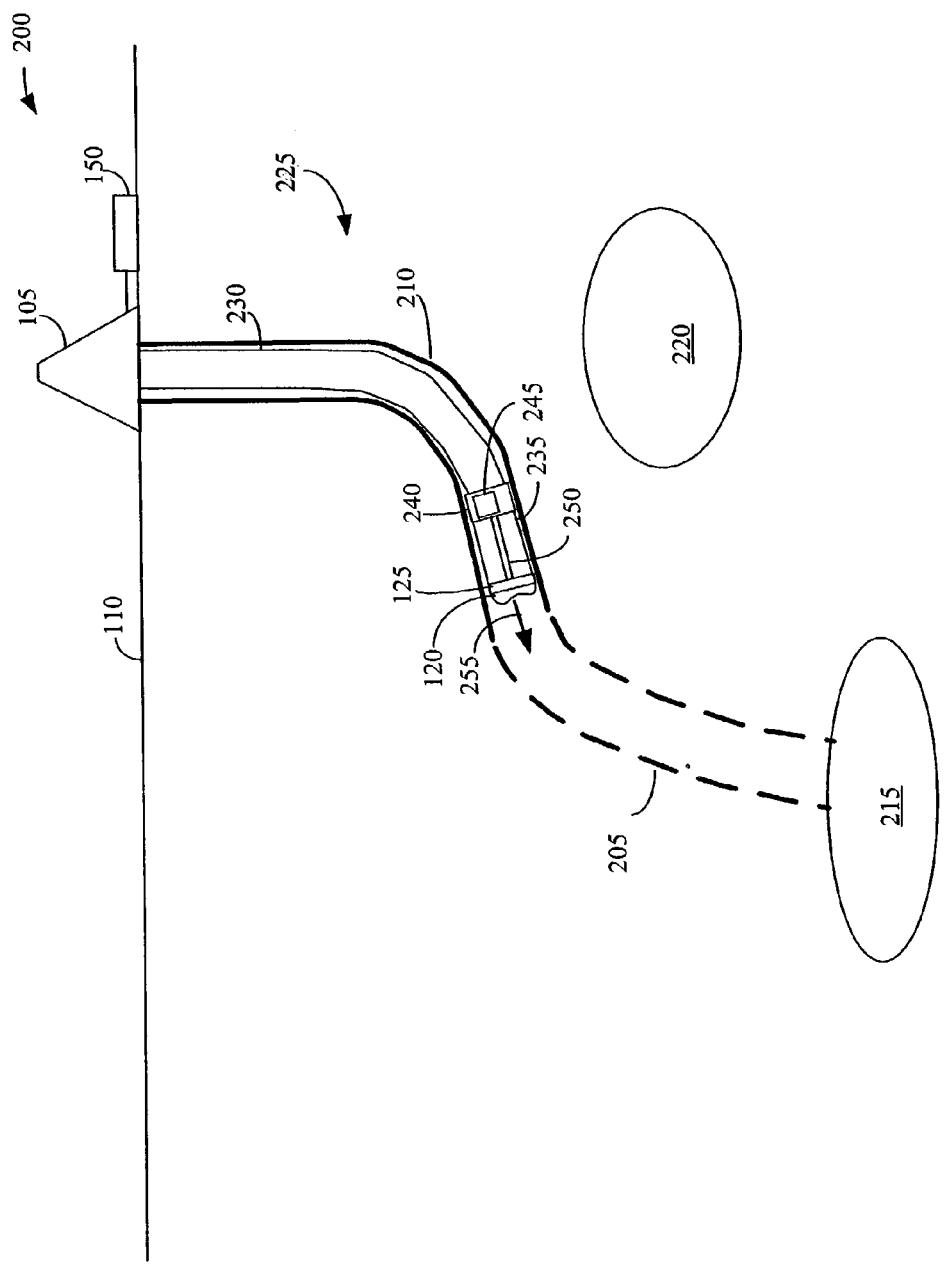
FIG. 2 conceptually illustrates a side view of a down-hole directional drilling system.

FIG. 2 conceptually illustrates an exemplary down-hole directional drilling system 200. A desired trajectory 205 of a down-hole borehole 210 is selected such that the down-hole borehole 210, when completed, extends from the drilling apparatus 105 to reach an underground target 215. For example, the underground target 215 may be an oil or natural gas deposit which is optimally produced at the specific target location. In the alternative embodiment shown in FIG. 2, the desired trajectory 205 is selected to avoid an underground obstruction 220, such as a fault, salt dome, another well bore, and the like.

In the illustrated embodiment, a drill string 225 includes an upper portion of the drill string 230 and a lower portion of the drill string 235, which are coupled together by a drill collar 240. For example, the collar 240 may be a non-magnetic drill collar 240. Although the upper portion 230 shown in FIG. 2 descends vertically into the earth, in alternative embodiments, the upper portion 230 may include bends, angles, and the like.

Two or more length measuring devices 250 are deployed along a surface of the lower portion 235 of the drill string 225. In the illustrated embodiment, the two or more length measuring devices 250 extend from a location near the trajectory measurement device 245 to a location near the drill bit 120. Thus, each length measuring device 250 may be used to determine a corresponding length along the lower portion 235 of the drill string 225. As will be described in more detail below, the controller 150 is capable of determining a relative heading, represented by the arrow 255, of the lower portion 235 using the two or more lengths determined by the two or more length measuring devices 250, in accordance with one embodiment of the present invention. Furthermore, the controller 150 is capable of determining a trajectory of the lower portion 235 relative to the trajectory of the upper portion 230 using the determined relative heading 255 and forming a signal indicative of a difference between the determined relative trajectory and the desired relative trajectory 205.

In the illustrated embodiment, a trajectory measurement device 245 is deployed proximate to the drill collar 240. For example, the trajectory measurement device 245 may be an inclinometer, a magnetometer, and the like, which may be deployed within the drill collar 240. In one embodiment, the upper and lower portions of the drill string 230, 235 may be magnetic and may inhibit, or prevent, the operation of the trajectory measurement device 245. Thus, the drill collar 240 may be a non-magnetic drill collar 240 that provides spacing between the trajectory measurement device 245 and the upper and lower portions of the drill string 230, 235. However, persons of ordinary skill in the art will appreciate that the trajectory measurement device 245 is optional and not necessary for the practice of the present invention. Furthermore, the trajectory measurement device 245, if present, need not be deployed within the drill collar 240. In alternative embodiments, the trajectory measurement device 245 may be deployed, for example, on a surface of the upper portion of the drill string 230.

The trajectory measurement device 245 is capable of providing a trajectory of the upper portion 230 and the drill collar 240 to the controller 150. For example, as will be appreciated by those of ordinary skill in the art having benefit of the present disclosure, the trajectory measurement device 245 determines the trajectory of the upper portion 230 using previously determined headings of the upper portion 230 and a length of the upper portion 230. In various alternative embodiments, the length of the upper portion may be determined using a length and/or depth of the borehole 130, a length of the drill string 115, 225, and/or a length of a portion of the drill string 115, 225 that is not inserted into the borehole 130.

In the illustrated embodiment, the controller 150 is capable of determining a trajectory of the lower portion of the drill string 235 using the determined relative heading 255 and the provided trajectory of the upper portion of the drill string 230. The controller 150 may also be capable of forming a signal indicative of a difference between the determined trajectory of the upper and lower portions of the drill string 235, 230 and the desired trajectory 205.

FIG. 3A conceptually illustrates a top-down view of one embodiment of the drill string 115, 225 that may be used in the directional drilling systems 100, 200, respectively. In the embodiment illustrated in FIG. 3A, two length measurement devices 310(1–2) having two lengths, hereinafter referred to as $L_1$ and $L_2$, respectively, are deployed along a portion of the drill string 115, 225. In one embodiment, e.g. the drill string 115 shown in FIGS. 1A–B, the two length measurement devices 310(1–2) are deployed along the length of the drill string 115. However, in alternative embodiments, the two length measurement devices 310(1–2) may not be deployed along the length of the drill string 115, 225. For example, in the embodiment illustrated in FIG. 2, the two length measurement devices 310(1–2) are deployed along the lower portion 235 of the drill string 225. The two length measurement devices 310(1–2) are deployed along an exterior surface of the drill string 115 in FIG. 3A. However, in alternative embodiments, the two length measurement devices 310(1–2) may be deployed along an interior surface of the drill string 115.

The heading of the drill string 115 is initially along the direction indicated by the arrow 315. The drill string 115 then bends towards the length measurement device 310(2) through an angle $\phi$ such that the heading of the drill string 115 is along the direction indicated by the arrow 320. Consequently, the length $L_1$ of the length measurement device 310(1) is larger than the length $L_2$ of the length measurement device 310(2), as will be appreciated by those of ordinary skill in the art having benefit of the present disclosure.

The drill string 115 has a diameter D, as indicated in FIG. 3A. Thus, in the illustrated smooth curvature embodiment, the angle $\phi$ is related to the length $L_1$, the length $L_2$, and the diameter D by the formula:

$$\phi = L_1 - L_2/D$$

However, it will be appreciated by those of ordinary skill in the art having benefit of the present disclosure that the aforementioned formula is intended to be exemplary and not to limit the present invention. In various alternative embodiments the assumptions used to derive the aforementioned formula may not apply and, consequently, other formulae and/or empirical relationships may be used to determine the angle $\phi$ from the length $L_1$ and the length $L_2$. For example, the curvature of the drill string 115 through the bend may not be smooth. For another example, the drill string 115 may not bend in the plane defined by the length measurement devices 310(1–2). For yet another example, the length measurement devices 310(1–2) may not be deployed with an angular separation of 180° about an axis of the drill string 115, as shown in FIG. 3A.

FIG. 3B conceptually illustrates a side view of a second embodiment of the drill string 115 that is alternative to the embodiment illustrated in FIG. 3A. In the embodiment illustrated in FIG. 3B, the two length measurement devices 310(1–2) are deployed along two lengths $L_1$ and $L_2$ of the drill string 115, as in the embodiment shown in FIG. 3A. However, in the embodiment illustrated in FIG. 3B, a third length measurement device 310(3) is deployed along a third length $L_3$ of the drill string 115. Furthermore, it will be appreciated by those of ordinary skill in the art having benefit of the present disclosure that more length measurement devices 310(1–3) may be deployed along the drill string 115 without departing from the scope of the present invention.

The heading of the drill string 115 shown in FIG. 31B is initially along the direction indicated by the arrow 330. The drill string 115 then bends away from the length measurement device 310(3) through an angle θ such that the heading of the drill string 115 is along the direction indicated by the arrow 335. In this particular example, it is assumed that the bend of the drill string 115 is in the plane of FIG. 3B. Consequently, the length $L_1$ of the length measurement device 310(1) is equal to the length $L_2$ of the length measurement device 310(2), and the length $L_3$ of the length measurement device 310(3) is larger than both $L_1$ and $L_2$, as will be appreciated by those of ordinary skill in the art having benefit of the present disclosure.

Thus, in the illustrated embodiment, the angle θ is related to the length $L_1$, the length $L_2$, the length $L_3$, and the diameter D by the formula:

$$\theta = 2L_3 - L_1 - L_2/D$$

However, it will be appreciated by those of ordinary skill in the art having benefit of the present disclosure that the aforementioned formula is intended to be exemplary and not to limit the present invention. As in the embodiment shown in FIG. 3A, the angle θ may be determined from the length $L_1$, the length $L_2$, and the length $L_3$ using other formulae and/or empirical relationships. In particular, the length $L_1$, the length $L_2$, and the length $L_3$ may be used to determine an angle of a bend that is not necessarily in the plane of FIG. 3B. For example, the length $L_1$, the length $L_2$, and the length $L_3$ may be used to determine two linearly independent angles that define the bend of the drill string 115 in three dimensions.

The length $L_1$, the length $L_2$, and, if available, the length $L_3$ may be provided to the controller 150 shown in FIGS. 1A–B and FIG. 2 so that the controller 150 can determine the heading of the drill bit 120. In the embodiment shown in FIGS. 1A–B, the controller 150 may determine the heading 155 using the length $L_1$, the length $L_2$, and, if available, the length $L_3$. In the embodiment shown in FIG. 2, the controller 150 may determine the relative heading 225 using the length $L_1$, the length $L_2$, and, if available, the length $L_3$. Furthermore, the controller 150 may determine the trajectory 130 of the drill string 115 using the length $L_1$, the length $L_2$, and, if available, the length $L_3$, as will be appreciated by those of ordinary skill in the art having benefit of the present disclosure.

Figure 4A:
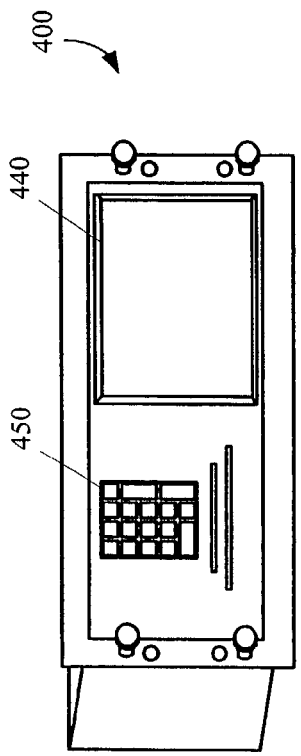
FIGS. 4A–B each show aspects of a rack-mounted computing apparatus that may be used in the directional drilling systems shown in FIGS. 1A–B and FIG. 2.
Figure 4B:
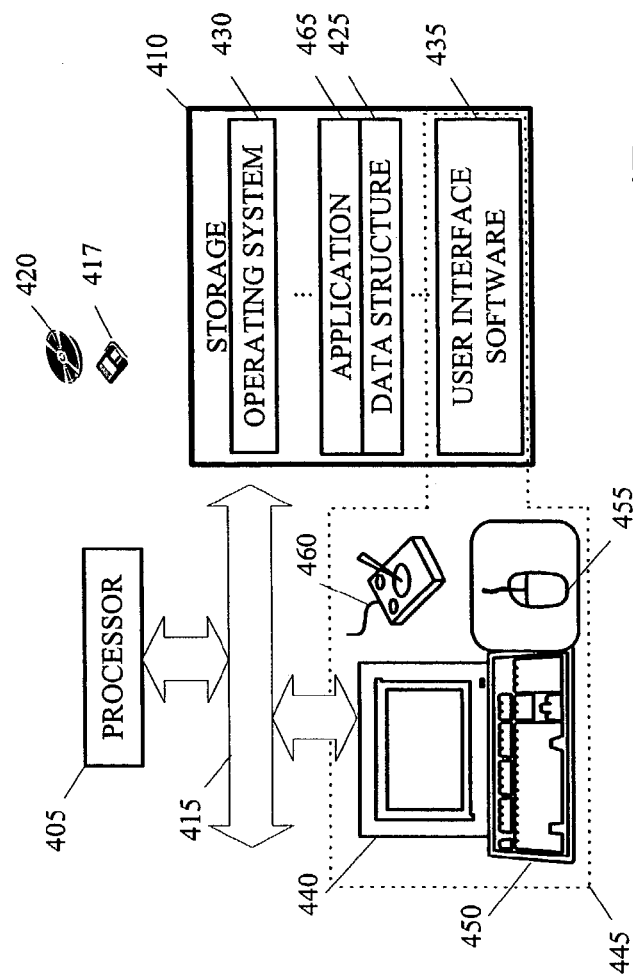

In one exemplary embodiment, illustrated in FIGS. 4A–B, the controller 150 is implemented in a rack-mounted computing apparatus 400. However, it will be appreciated by those of ordinary skill in the art having benefit of the present disclosure that other processor-based systems may also be used to implement the controller 150. For example, the controller 150 may be implemented in a personal desktop computer, a portable laptop, a personal data assistant, a programmable calculator, and the like. For another example, the headings 155, 255 and/or trajectory 130 of the drill string 115 may be computed by hand.

The computing apparatus 400 includes a processor 405 communicating with some storage 410 over a bus system 415. The storage 410 may include a hard disk and/or random access memory ("RAM") and/or removable storage such as a floppy magnetic disk 417 and an optical disk 420. The storage 410 is encoded with a data structure 425 storing the signals collected as discussed above, an operating system 430, user interface software 435, and an application 465. The user interface software 435, in conjunction with a display 440, implements a user interface 445. The user interface 445 may include peripheral I/O devices such as a key pad or keyboard 450, a mouse 455, or a joystick 460. The processor 405 runs under the control of the operating system 430, which may be practically any operating system known to the art. The application 465 is invoked by the operating system 430 upon power up, reset, or both, depending on the implementation of the operating system 430.

In the illustrated embodiment, the rack-mounted computing apparatus 400 is used to implement at least a portion of the controller 150 (shown in FIGS. 1A–B and FIG. 2). Consequently, some portions of the detailed descriptions herein are presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantifies. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

Figure 5:
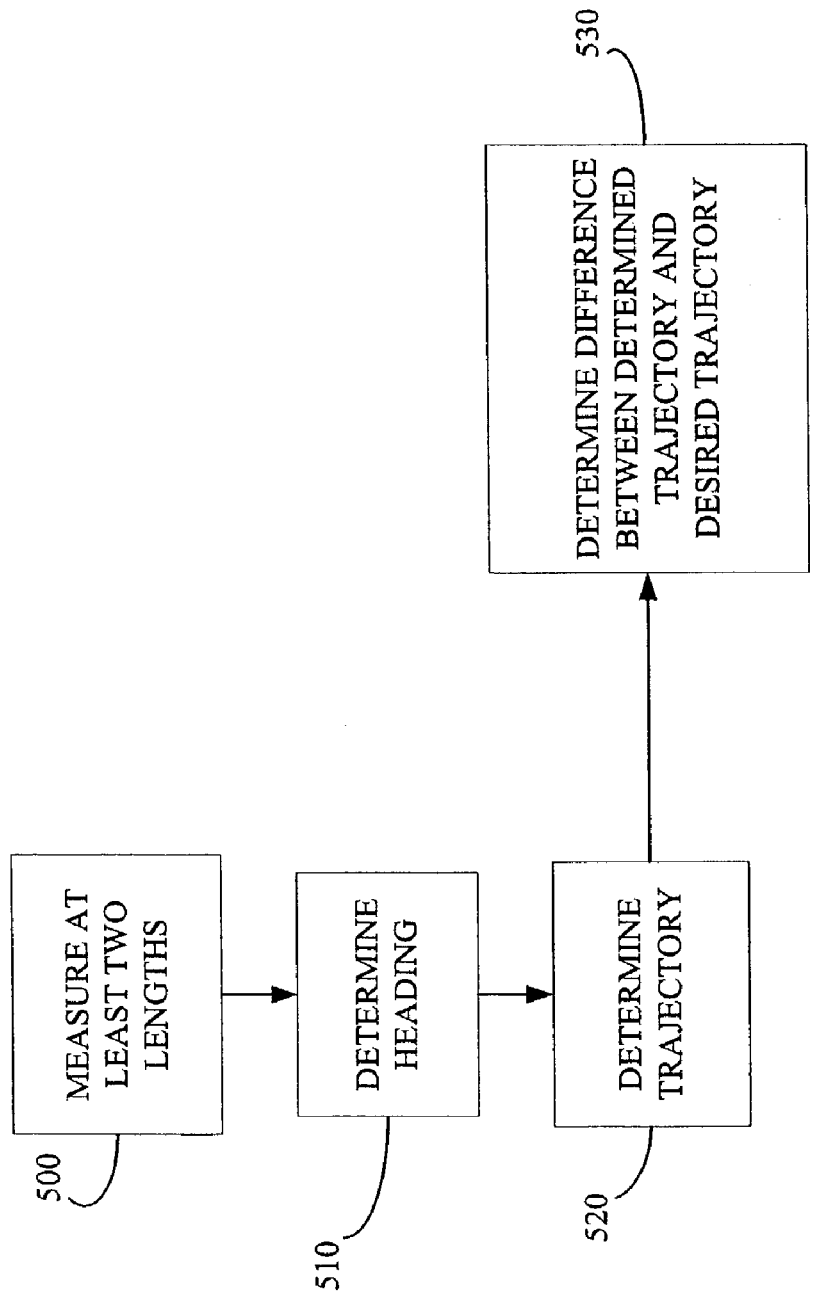
FIG. 5 illustrates an exemplary method of measuring a trajectory that may be used in the directional drilling systems shown in FIGS. 1A–B and FIG. 2.

FIG. 5 illustrates an exemplary method of measuring a trajectory of the drill string 115, 225, first shown in FIGS. 1A–B and FIG. 2, respectively. At least two lengths, e.g. the length $L_1$, the length $L_2$, and, if available, the length $L_3$, are measured (at 500) by the aforementioned length measurement devices 310(1–3). The heading 155 of the drill bit 120 is then determined (at 510) using the at least two determined lengths. The determined heading 155 is used—possibly in conjunction with one or more previously determined headings 155, a length and/or depth of the borehole 130, a length of the drill string 115, 225, and/or a length of a portion of the drill string 115, 225 that is not inserted into the borehole 130—to determine (at 520) the trajectory 130 of the drill string 115. In one embodiment, the controller 150 may also determine (at 530) a difference between the determined trajectory 130 and a desired trajectory, e.g. the desired trajectory 140 shown in FIGS. 1A–B and FIG. 2.

FIGS. 6A–D show four exemplary embodiments of the length measurement devices 310(1–3). Although only one length measurement device 310(1) is shown in each of FIGS. 6A–D, persons of ordinary skill in the art having benefit of the present disclosure will appreciate that at least two length measurement devices 310(1–3) are used in the practice of the present invention. Furthermore, the various alternative embodiments of the length measurement devices 310(1–3) illustrated in FIGS. 6A–D may be used in any desirable combination.

Figure 6A:
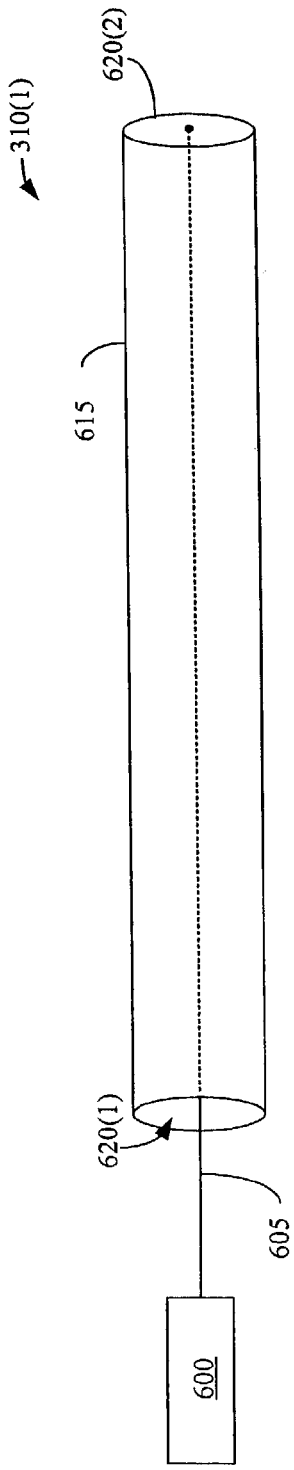
FIGS. 6A–D show exemplary embodiments of length measurement devices that may be used in the directional drilling systems shown in FIGS. 1A–B and FIG. 2.

FIG. 6A conceptually illustrates a first exemplary embodiment of the length measurement device 310(1) that includes a displacement detector 600 coupled to a cord 605. For example, the displacement detector 600 may be a linear variable displacement transducer, a force sensor, a force transducer, a rotary potentiometer, a cable extension transducer, a linear potentiometer, and the like. The cord 605 may, in alternative embodiments, be any desirable flexible elongated member including, but not limited to, a wire, a cable, a string, a tape, a rod, a chain, a filament, and a rope.

Although not necessary for the practice of the present invention, the embodiment illustrated in FIG. 6A includes a guide 615 having first and second ends 620(1–2). The cord 605 passes through the first end 620(1) and is coupled to the second end 620(2). The guide 615 is capable of constraining the cord 605 to follow the drill string 115, but does not restrain the lengthwise motion of the cord 615 along the drill string 115. Accordingly, the guide 615 may be a coiled member, a tube, a series of loops, or the like. As will be appreciated by those of ordinary skill in the art having benefit of the present disclosure, the guide 615 may restrain the cord 605 so that it follows the drill string 115 within predetermined tolerances, which are a matter of design choice and are not material to the present invention.

The guide 615 is deployed along the drill string 115. For example, the guide 615 may be soldered, glued, or welded to the drill string 115. Alternatively, the guide 615 may be coupled to the drill string 115 using a variety of devices known to those of ordinary skill in the art. For example, in tunnel boring applications, the guide 615 may be a steel water pipe that is welded to an exterior surface of a liner pipe.

Figure 6B:
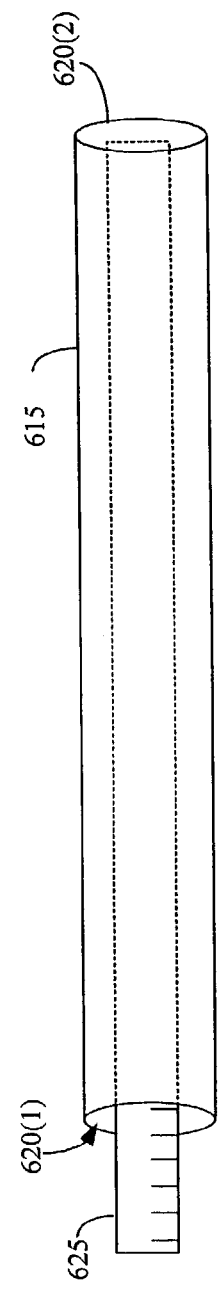

FIG. 6B conceptually illustrates a second exemplary embodiment of the length measurement device 310(1) that includes a surveyor's tape 625 deployed in the guide 615. For example, the surveyor's tape 625 may pass through the first end 620(1) of the guide 615 and be coupled to the second end 620(2) so that the guide 615 constrains the surveyor's tape 625 to follow the drill string 115. The use of the surveyor's tape 625 as a length measurement device 310(1) is well known in the art and will not be discussed further herein.

Figure 6C:
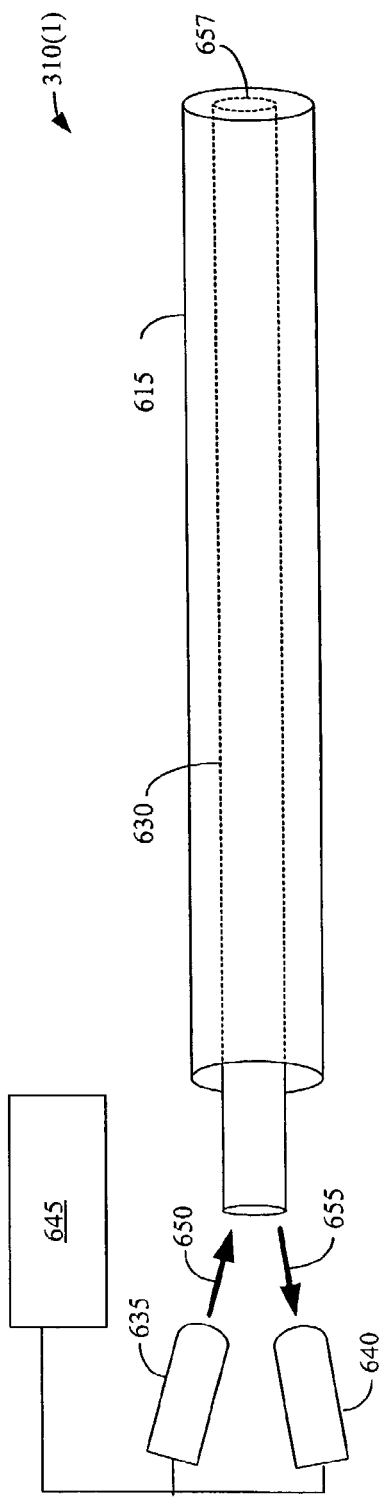

FIG. 6C conceptually illustrates a third exemplary embodiment of the length measurement device 310(1) that includes a transmission medium 630, a signal source 635, a receiver 640, and a signal processing unit 645. In the illustrated embodiment, the signal source 635 provides a transmitted signal, represented by the arrow 650, to the transmission medium 630. The signal 650 travels through the transmission medium 630 and a received signal 655 is received by the receiver 640. For example, in one embodiment, the signal 650 may reflect and/or refract from an end 657 of the transmission medium 630 to form the received signal 655.

The signal processing unit 645 may then use the transmitted and received signals 650, 655 to determine the length of the length measurement device 310(1). For example, the signal processing unit 645 may determine the length by determining a propagation time using the transmitted and received signals 650, 655. In one embodiment, the signal processing unit 645 is a separate device capable of determining the length of the length measurement device 310(1) using the transmitted and received signals 650, 655. However, in an alternative embodiment, at least a portion of the signal processing unit 645 may be incorporated into the controller 150 shown in FIG. 1A.

The transmission medium 630, the signal source 635, and the receiver 640 may be any of a variety of components well known to those of ordinary skill in the art having benefit of the present disclosure. For example, the transmission medium 630, the signal source 635, and the receiver 640 may be a fiber optic cable, an optical transmitter, and an optical receiver, respectively. In particular, the signal source 635 may be a laser. For another example, the transmission medium 630, the signal source 635, and the receiver 640 may be an acoustic waveguide, an acoustic source for providing an acoustic signal, and an acoustic receiver, respectively. For yet another example, the transmission medium 630, the signal source 635, and the receiver 640 may be an electromagnetic waveguide, an electromagnetic source for providing an electromagnetic signal, and an electromagnetic receiver, respectively.

Figure 6D:
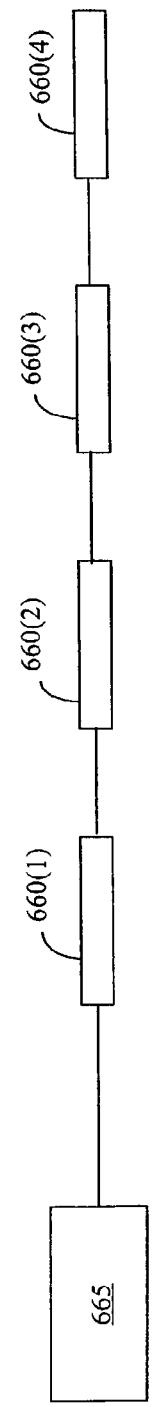

FIG. 6D conceptually illustrates a fourth exemplary embodiment of the length measurement device 310(1) that includes strain gauge sensors 660(1–4) and a signal processing unit 665 capable of determining the length of the length measurement device 310(1) using the strain gauge sensors 660(1–4). When coupled to at least a portion of the drill string 115, 225, the properties of the strain gauge sensors 660(1–4) change in response to changes in the length of the portion of the drill string 115, 225. Thus, the strain gauge elements 660(1–4) may be used as one embodiment of the length measurement device 310(1). For example, in one embodiment, the strain gauge sensors 660(1–4) are piezoresistive elements. In this embodiment, the change in the resistance of the strain gauge sensors 660(1–4) is proportional to the change in the length of the portion of the drill string 115, 225. However, in alternative embodiments, the strain gauge sensors 660(1–4) may not necessarily be piezoresistive elements and the properties of the strain gauge sensors 660(1–4) may be related to the length of the portion of the drill string 115, 225 by other mathematical and/or empirical relations.

Although four strain gauge sensors 660(1–4) are shown in FIG. 6D, the present invention may include more or fewer strain gauge sensors 660(1–4). In one alternative embodiment, the length measurement device 310(1) includes a single strain gauge sensor 660(1). For example, the strain gauge sensor 660(1) may be a single piezoresistive element deployed along the drill string 115, 225. For another example, the strain gauge sensor 660(1) may be a single piezoelectric element deployed along the drill string 115, 225.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. An apparatus for measuring a heading of a drill string, comprising
   two length measurement devices deployed along a surface of the drill string, wherein at least one of the length measurement devices comprises:
      a displacement detector; and
      a cord deployed along at least one of the lengths of the drill string and coupled to the displacement detector; and
   a controller capable of determining the heading of the drill string from two lengths of the drill string measured by the two length measurement devices.

2. The apparatus of claim 1, wherein the displacement detector comprises at least one of a linear variable displacement transducer, a force sensor, a force transducer, a rotary potentiometer, a cable extension transducer, and a linear potentiometer.

3. The apparatus of claim 1, wherein the cord comprises at least one of a wire, a cable, a string, a rod, a chain, a tape, a filament, and a rope.

4. An apparatus for measuring a heading of a drill string, comprising
   two length measurement devices deployed along a surface of the drill string, wherein at least one of the length measurement devices comprises a portion of surveyor's tape; and
   a controller capable of determining the heading of the drill string from two lengths of the drill string measured by the two length measurement devices.

5. An apparatus for measuring a heading of a drill string, comprising
   two length measurement devices deployed along a surface of the drill string, wherein at least one of the length measurement devices comprises:
      at least one strain gauge sensor; and
      a signal processing unit capable of determining a length using the strain gauge sensor; and
   a controller capable of determining the heading of the drill string from two lengths of the drill string measured by the two length measurement devices.

6. The apparatus of claim 5, wherein the at least one strain gauge sensor comprises at least one of a piezoelectric and a piezoresistive device.

7. An apparatus for measuring a heading of a drill string, comprising
   two length measurement devices deployed along a surface of the drill string, wherein the two length measurement devices are deployed within two guides; and
   a controller capable of determining the heading of the drill string from two lengths of the drill string measured by the two length measurement devices.

8. A method, comprising:
   determining at least two lengths along a surface of a drill string, wherein determining the at least two lengths along the surface of the drill string comprises determining the at least two lengths using at least two length measurement devices deployed within at least two guides positioned along the surface of the drill string; and
   determining a heading of the drill string using the at least two determined lengths.

9. The method of claim 8, wherein determining the at least two lengths along the surface of the drill string comprises determining the at least two lengths using at least two surveyors tapes deployed within the at least two guides.

10. The method of claim 8, wherein determining the at least two lengths along the surface of the drill string comprises determining the at least two lengths using at least two cords deployed within the at least two guides, and wherein the at least two cords are coupled to at least two displacement detectors.

11. A method, comprising:
   determining at least two lengths along a surface of a drill string, wherein determining the at least two lengths along the surface of the drill string comprises determining the at least two lengths using at least two strain gauge sensors; and
   determining a heading of the drill string using the at least two determined lengths.

12. The method of claim 11, wherein determining the at least two lengths using the at least two strain gauge sensors comprises determining the at least two lengths using at least two strain gauge sensors deployed such that at least two lengths of the at least two strain gauge sensors correspond to the at least two determined lengths along the surface of the drill string.

13. An apparatus for measuring a heading of a drill string, comprising:
   three cords deployed along the drill string;
   three displacement detectors coupled to the three cords, the three displacement detectors being capable of determining three lengths corresponding to the three cords; and
   a controller capable of determining the heading of the drill string using the three determined lengths.

14. The apparatus of claim 13, further comprising three guides coupled to the surface of the drill string.

15. The apparatus of claim 14, wherein the three cords are deployed within the three guides.

16. The apparatus of claim 13, wherein the surface of the drill string is an interior surface.

17. The apparatus of claim 13, wherein the surface of the drill string is an exterior surface.

18. The apparatus of claim 13, wherein the controller is capable of determining the heading of the drill string using two differences between the three determined lengths.

19. The apparatus of claim 13, wherein the controller is capable of determining a difference between the heading and a desired heading.

20. The apparatus of claim 19, wherein the controller is capable of providing a signal indicative of the difference between the heading and the desired heading.

21. The apparatus of claim 13, wherein the three cords are displaced angularly about an axis of the drill string.

22. The apparatus of claim 13, wherein the displacement detectors are spaced apart circumferentially about the drill string.

23. A system for trench-less directional drilling, comprising:
   a drill string having a first end and a second end;
   a drill bit deployed near the first end of the drill string;
   at least two length measurement devices deployed along a surface of the drill string, wherein the at least two length measurement devices are capable of determining at least two lengths from the first end of the drill string to the second end of the drill string along the surface of the drill string, wherein at least one of the length measurement devices comprises:
      a guide deployed substantially along the surface of the drill string;

a cord deployed in the guide; and a displacement detector coupled to the cord and capable of providing a signal indicative of a length of the cord; and a controller capable of:

determining a heading of the drill string using the at least two lengths;

determining a trajectory of the drill string based on the determined heading; and controlling the drill bit such that the determined trajectory corresponds to a desired trajectory.

24. A system for down-hole directional drilling, comprising:

a first portion of a drill string, the first portion having a first end and a second end;

a drill bit deployed near the first end of the first portion of the drill string;

at least two length measurement devices deployed along a surface of the first portion, wherein the at least two length measurement devices are capable of determining at least two lengths from the first end to the second end along the surface of the first portion, wherein at least one of the length measurement devices comprises:

a strain gauge sensor; and a signal processing unit capable of determining a length using the strain gauge sensor; and a controller capable of:

determining a heading of the first portion using the at least two lengths;

determining a trajectory of the first portion based on the determined heading; and controlling the drill bit such that the determined trajectory corresponds to a desired trajectory.

25. A system for down-hole directional drilling, comprising:

a first portion of a drill string, the first portion having a first end and a second end;

a drill bit deployed near the first end of the first portion of the drill string;

at least two length measurement devices deployed along a surface of the first portion, wherein the at least two length measurement devices are capable of determining at least two lengths from the first end to the second end along the surface of the first portion, wherein at least one of the length measurement devices comprises:

a guide deployed substantially along the surface of the first portion of the drill string;

a cord deployed in the guide; and a displacement detector coupled to the cord and capable of providing a signal indicative of a length of the cord; and a controller capable of:

determining a heading of the first portion using the at least two lengths;

determining a trajectory of the first portion based on the determined heading; and controlling the drill bit such that the determined trajectory corresponds to a desired trajectory.

26. An apparatus for measuring a heading of a drill string, comprising:

two length measurement devices deployed along a surface of the drill string; and a controller capable of determining the heading of the drill string from two lengths of the drill string measured by the two length measurement devices, the heading being determined on an axis parallel to the plane defined by the two measured lengths.

27. The apparatus of claim 26, wherein at least one of the length measurement devices comprises:

a displacement detector; and a cord deployed along at least one of the lengths of the drill string and coupled to the displacement detector.

28. The apparatus of claim 27, wherein the displacement detector comprises at least one of a linear variable displacement transducer, a force sensor, a force transducer, a rotary potentiometer, a cable extension transducer, and a linear potentiometer.

29. The apparatus of claim 27, wherein the cord comprises at least one of a wire, a cable, a string, a rod, a chain, a tape, a filament, and a rope.

30. The apparatus of claim 26, wherein at least one of the length measurement devices comprises:

a transmission medium;

a signal source capable of transmitting a signal over the transmission medium;

a receiver capable of receiving the signal; and a signal processing unit capable of determining a length of the transmission medium using the transmitted and received signals.

31. The apparatus of claim 26, wherein at least one of the length measurement devices comprises:

at least one strain gauge sensor; and a signal processing unit capable of determining a length using the strain gauge sensor.

32. The apparatus of claim 26, wherein the controller is capable of determining a trajectory of the drill string using the determined heading.

33. The apparatus of claim 26, further comprising a third length measurement device deployed along the surface of the drill string, and wherein the controller is capable of determining the heading of the drill string from the three measured lengths of the drill string measured by the three length measurement devices.

* * * * *